United States Patent
Zhang et al.

(10) Patent No.: US 8,855,966 B2
(45) Date of Patent: Oct. 7, 2014

(54) ELECTRONIC DEVICE HAVING PROXIMITY SENSOR AND METHOD FOR CONTROLLING THE SAME

(75) Inventors: Jun Zhang, Shanghai (CN); Chi-Ming Lu, New Taipei (JP)

(73) Assignees: Ambit Microsystems (Shanghai) Ltd., Shanghai (CN); Hon Hai Precision Industry Co., Ltd., New Taipei (TW)

( * ) Notice: Subject to any disclaimer, the term of this patent is extended or adjusted under 35 U.S.C. 154(b) by 411 days.

(21) Appl. No.: 13/220,623

(22) Filed: Aug. 29, 2011

(65) Prior Publication Data

US 2012/0245886 A1  Sep. 27, 2012

(30) Foreign Application Priority Data

Mar. 21, 2011  (CN) .......................... 2011 1 0067137

(51) Int. Cl.
  G06F 15/00  (2006.01)
  G06F 3/01  (2006.01)
  G06F 3/0488  (2013.01)

(52) U.S. Cl.
  CPC ............ *G06F 3/04883* (2013.01); *G06F 3/017* (2013.01)
  USPC ........... 702/150; 345/173; 345/174; 345/175; 345/629

(58) Field of Classification Search
  USPC .......... 702/150; 345/175, 158, 174, 167, 173, 345/629, 660, 684; 340/3.1, 539.15; 178/18.01, 18.03, 18.06; 715/788, 863
  See application file for complete search history.

(56) References Cited

U.S. PATENT DOCUMENTS

| | | | |
|---|---|---|---|
| 7,884,807 B2 * | 2/2011 | Hovden et al. ................. | 345/173 |
| 8,174,504 B2 * | 5/2012 | Arthur et al. .................. | 345/173 |
| 8,432,366 B2 * | 4/2013 | Hodges et al. ................. | 345/173 |
| 8,432,372 B2 * | 4/2013 | Butler et al. ................... | 345/174 |
| 8,619,029 B2 * | 12/2013 | Alameh et al. ................. | 345/158 |
| 2007/0083915 A1 * | 4/2007 | Janakiraman et al. ............ | 726/4 |
| 2007/0279315 A1 * | 12/2007 | Laves et al. ..................... | 345/1.1 |
| 2008/0106523 A1 * | 5/2008 | Conrad .......................... | 345/173 |
| 2008/0284738 A1 * | 11/2008 | Hovden et al. ................. | 345/173 |
| 2009/0015559 A1 * | 1/2009 | Day et al. ....................... | 345/167 |
| 2009/0262078 A1 * | 10/2009 | Pizzi .............................. | 345/169 |
| 2010/0097332 A1 * | 4/2010 | Arthur et al. .................. | 345/173 |
| 2010/0321289 A1 | 12/2010 | Kim et al. | |
| 2011/0012840 A1 * | 1/2011 | Hotelling et al. ............. | 345/173 |
| 2011/0018795 A1 * | 1/2011 | Jang .............................. | 345/156 |
| 2011/0148786 A1 * | 6/2011 | Day et al. ....................... | 345/173 |

(Continued)

FOREIGN PATENT DOCUMENTS

CN  101895799 A  11/2010
TW  201033859  9/2010

*Primary Examiner* — Carol S Tsai
(74) *Attorney, Agent, or Firm* — Novak Druce Connolly Bove + Quigg LLP

(57) ABSTRACT

An electronic device includes a main body; at least one proximity sensor arranged in the main body to detect a motion of a user in a predetermined range from the main body. A memory arranged in the main body store a relationship table defining a relationship between an operation event and an executable function. The operation event includes: the times of the proximity of a user to the main body, the duration of a stationary state of the user relative to the main body, and the distance of the movement of a user with respect to the main body. In addition, includes a processor receiving data from the at least one sensor determining an operation event and executing an executable function according to the relationship table.

2 Claims, 4 Drawing Sheets

(56) References Cited

U.S. PATENT DOCUMENTS

| | | | |
|---|---|---|---|
| 2011/0185316 A1* | 7/2011 | Reid et al. | 715/863 |
| 2011/0296357 A1* | 12/2011 | Kim | 715/863 |
| 2011/0306304 A1* | 12/2011 | Forutanpour et al. | 455/67.11 |
| 2011/0312349 A1* | 12/2011 | Forutanpour et al. | 455/466 |
| 2012/0154292 A1* | 6/2012 | Zhao et al. | 345/173 |
| 2012/0229248 A1* | 9/2012 | Parshionikar et al. | 340/3.1 |
| 2013/0125045 A1* | 5/2013 | Sun et al. | 715/788 |
| 2013/0234970 A1* | 9/2013 | Hodges et al. | 345/173 |

* cited by examiner

ELECTRONIC DEVICE HAVING PROXIMITY SENSOR AND METHOD FOR CONTROLLING THE SAME

BACKGROUND

1. Technical Field

The present disclosure relates to an electronic device having a proximity sensor and method for controlling the electronic device.

2. Description of Related Arts

There exist today many styles of input devices for performing operations in an electronic system. The operations generally correspond to moving a cursor and making selections on a display screen. By way of example, the input devices may include buttons, switches, keyboards, mice, trackballs, touch pads, joy sticks, or touch screens. Each of these devices has advantages and disadvantages that are taken into account when designing the electronic system.

Although devices such as these work well, there are continuing efforts to improve their form, feel and functionality. An improved input means and an operational method associated therewith is therefore desired.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail below, with reference to the accompanying drawings.

Figure 1:
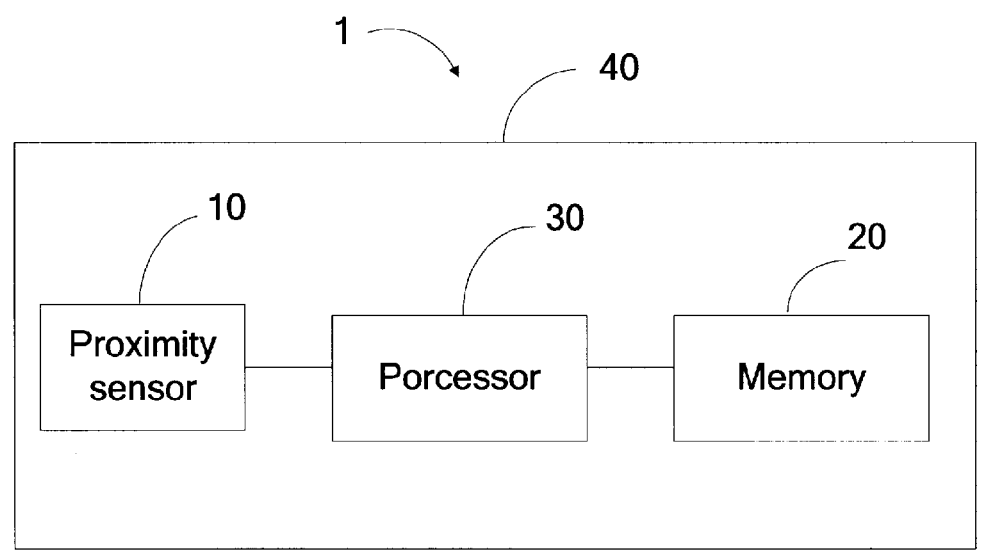
FIG. 1 is a schematic block diagram of an electronic device according to an embodiment.

Referring to FIG. 1, an electronic device 1 includes a proximity sensor 10, a memory 20, and a processor 30. The proximity sensor 10, the memory 20, and the processor 30 are arranged in a main body 40. The proximity sensor 10 can detect the motion of a user in a predetermined range from the main body 40. The data from the proximity sensor 10 can be used to determine the proximity of a user to the main body 40, a stationary state of the user relative to the main body 40, and a movement of the user with respect to the main body 40. In the embodiment, the motion of a user can be generated from a body part movement of a user.

The memory 20 stores a relationship table that defines a relationship between an operation event and a function. The operation event includes, but are not limited to, times of the proximity of a user to the main body 40, a duration of a stationary state of the user relative to the main body 40, and a distance of the movement of a user with respect to the main body 40. The processor 30 can receive data from the proximity sensor 10 and determine an operation event based on the received data. The processor 30 can further determine a function corresponding to the determined operation event according to the relationship table and execute the determined function.

Figure 2:
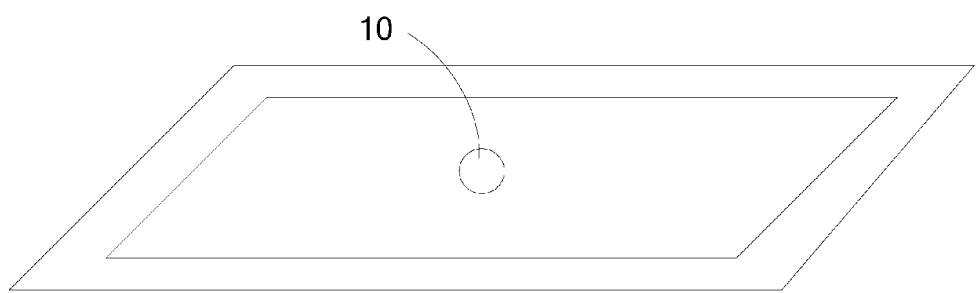
FIG. 2 is a schematic view showing the electronic device of FIG. 1 with one proximity sensor.

Referring to FIG. 2, in one embodiment, only one proximity sensor 10 is used. The proximity sensor 10 can be an infrared sensor and arranged at the center of the electronic device 1. In the embodiment, the relationship table stored in the memory 20 defines a relationship between the operation event and media playing control. For example, more than 3 times of the proximity of a user to the main body 40 in a predetermined time period corresponds to starting playing the media, and the duration of a stationary state of the user relative to the main body 40 exceeding at least 3 seconds corresponds to ending the playing of the media. The processor 30 will start media playing and end media playing according to the relationship table.

Figure 3:
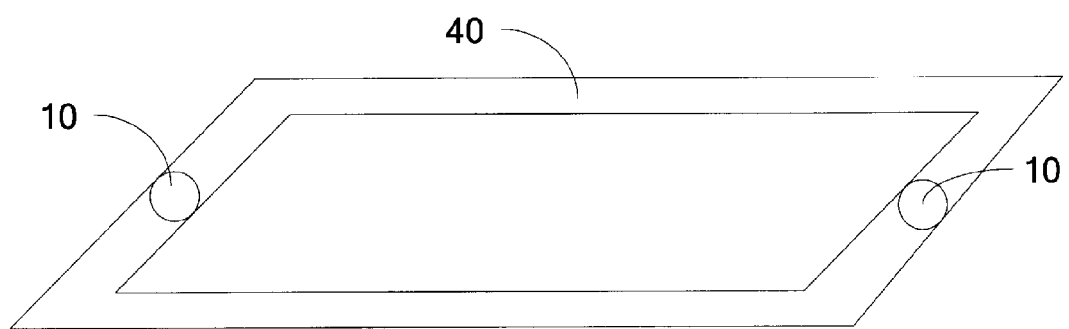
FIG. 3 is a schematic view showing the electronic device of FIG. 1 with two proximity sensors.

Referring to FIG. 3, in an alternative embodiment, two proximity sensors 10 are used and are respectively arranged at a first side and a second side of the main body 40. In the embodiment, the data from the two sensors 10 can be used to determine the movement of a hand of the user relative to the main body 40. In one embodiment, when a the hand of the user moves from the first side to the second side, the processor 30 will first receive signals from the proximity sensor 10 corresponding to the first side, and then receive signals from the proximity sensor 10 corresponding to the second side. When a hand of the user moves from the second side to the first side, the processor 30 will first receive signals from the proximity sensor 10 corresponding to the second side, and then receive signals from the proximity sensor 10 corresponding to the first side.

In the embodiment, the processor 30 identifies the movement of a hand of the user from the first side to the second side as a first operation event, and the movement of a hand of the user from the second side to the first side as a second operation event. The relationship table stored in the memory 20 further defines a relationship between the operation events and media playing control. That is, the first operation event corresponds to starting playing the media, and the second operation event corresponds to ending playing the media.

In yet another embodiment, there are four proximity sensors 10, respectively arranged at four sides of the electronic device 1. The data from the four proximity sensors 10 can be used to determine the movement of a hand of the user relative to the main body 40. In this embodiment, when a hand of the user moves clockwise along the four sides, the processor 30 will receive signals in sequence from the four proximity sensors 10. When a hand of the user moves counterclockwise along the four sides, the processor 30 will receive signals in sequence from the four proximity sensors 10 in a reverse order.

In the embodiment, the processor 30 identifies the clockwise movement of a hand of the user as a first operation event, and the counterclockwise movement of a hand of the user as a second operation event. The relationship table stored in the memory 20 further defines a relationship between the operation events and media playing control. That is, the first operation event corresponds to starting start playing the media, and the second operation event corresponds to ending the playing of the media.

In one embodiment, the proximity sensor 10 will always be enabled after the startup of the electronic device 1. In another embodiment, the electronic device 1 may include a selection button to allow a user to enable/disable the proximity sensor 10.

Figure 4:
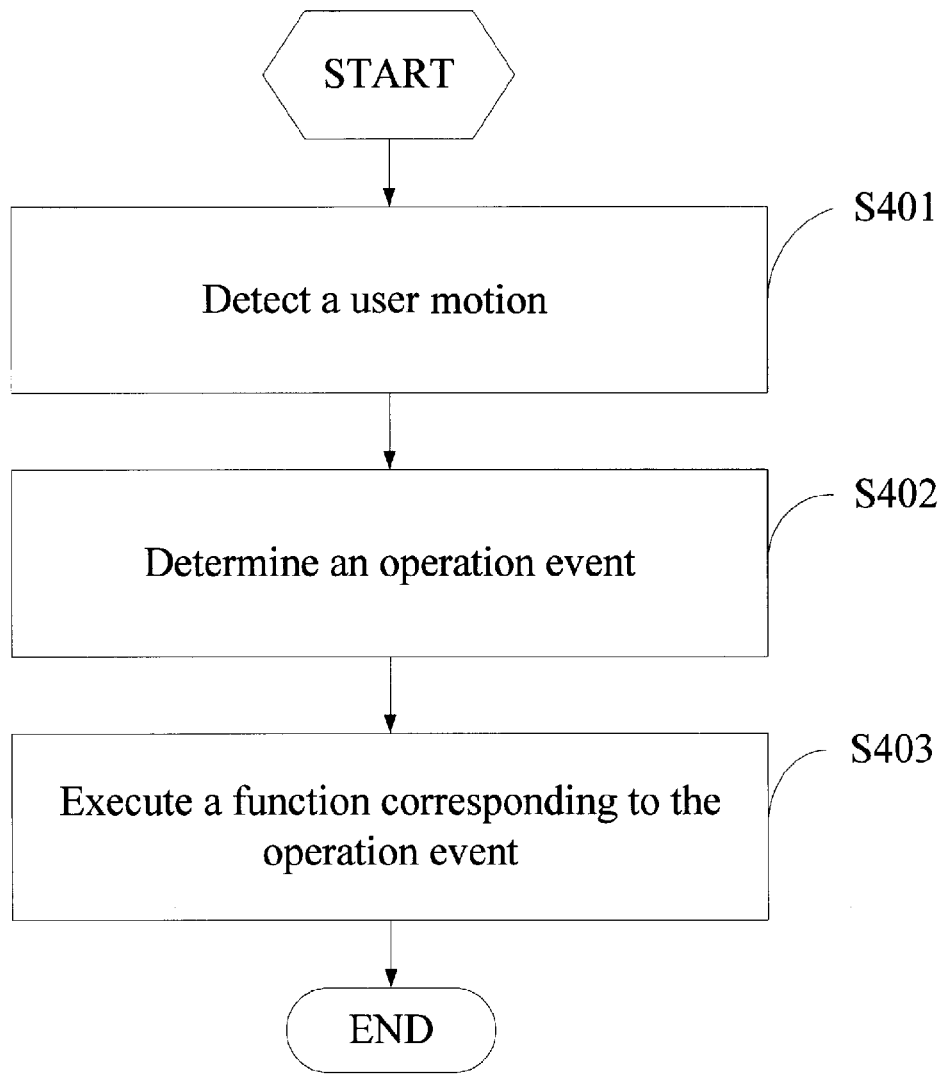
FIG. 4 shows a flowchart of an exemplary method for controlling the electronic device of FIG. 1.

FIG. 4 shows a flow chart of a method implemented by the electronic device 1. In step S401, the proximity sensor 10 detects a motion of the user. In step S402, the processor 30 receives data from the proximity sensor 10 and determines an operation event. In step S403, the processor 30 executes a function corresponding to the determined operation event according to the relationship table stored in the memory 20.

While various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An electronic device comprising:
   a main body;
   at least one proximity sensor arranged in the main body and configured to detect a user's motion in a predetermined range from the main body;
   a memory arranged in the main body and configured to store a relationship table defining a relationship between an operation event and an executable function, wherein the operation event comprises: times of the proximity of a user to the main body, a duration of a stationary state of the user relative to the main body, and a distance of the movement of a user with respect to the main body; and
   a processor configured to receive data from the at least one proximity sensor to determine an operation event and to execute an executable function according to the relationship table;
   wherein the number of at least one proximity sensor is two, the two proximity sensors are respectively arranged at a first side and a second side of the main body;
   the relationship table further defines that a movement of a user's hand from the first side to the second side corresponds to starting media playing, and that a movement of a user's hand from the second side to the first side corresponds to ending media playing; and
   the processor determines the movement of a user's hand from the first side to the second side or from the second side to the first side based on the sequence of receiving signals from the two proximity sensors, and executes starting media playing function or ending media playing function according to the relationship table.

2. The electronic device according to claim 1, wherein the relationship table defines that the duration of a stationary state of the user relative to the main body exceeding a predetermined time period corresponds to staring media playing function, and that the times of the proximity of a user to the main body exceeding a preset value corresponds to ending media playing function.

* * * * *